United States Patent [19]

Kato

[11] Patent Number: 5,436,806

[45] Date of Patent: Jul. 25, 1995

[54] ILLUMINATION DEVICE

[75] Inventor: Hideyuki Kato, Nishio, Japan

[73] Assignee: Nippondenso Co., Ltd., Kariya, Japan

[21] Appl. No.: 326,336

[22] Filed: Oct. 20, 1994

[30] Foreign Application Priority Data

Oct. 20, 1993 [JP] Japan ................... 5-262647

[51] Int. Cl.⁶ .............................................. F21V 7/04
[52] U.S. Cl. .................................. 362/32; 362/61;
385/32; 385/33; 385/901
[58] Field of Search ............... 362/32, 26, 27, 61,
362/80; 385/32, 33, 901

[56] References Cited

U.S. PATENT DOCUMENTS

| | | | |
|---|---|---|---|
| 4,811,172 | 3/1989 | Davenport et al. | 362/61 |
| 5,222,794 | 6/1993 | Windross | 362/32 |
| 5,343,367 | 8/1994 | Davenport et al. | 362/32 |
| 5,365,412 | 11/1994 | Koppolu et al. | 362/32 |
| 5,369,554 | 11/1994 | Erion | 362/32 X |

FOREIGN PATENT DOCUMENTS

668702  3/1994  Japan .

Primary Examiner—Stephen F. Husar
Attorney, Agent, or Firm—Cushman, Darby & Cushman

[57] ABSTRACT

An illumination device able to maintain a high level of light utilization and provide essential functions using a compact design. The illumination device includes a light source, at least one fiberoptic cable for transmitting light from the light source, and at least one lamp device for producing a desired light distribution. The lamp device includes a light bending and conducting path that directly receives the light emitted from the fiberoptic cable. The light bending and conducting path bends the light beam by a desired angle. The lamp device further includes light conducting path lenses that are directly connected to the light bending and conducting path. The lenses produce the desired lights distribution.

17 Claims, 6 Drawing Sheets

ILLUMINATION DEVICE

CROSS REFERENCE TO RELATED APPLICATIONS

This application is based upon and claims priority from Japanese Patent Application 5-262647 filed Oct. 20, 1993, the contents of which are incorporated herein by reference.

BACKGROUND OF THE INVENTION

1. Field of the Invention

This invention relates to an illuminating device. More particularly, the present invention relates to an illuminating device in which a light source is provided separately from a lamp device.

2. Related Art

Japanese Patent Application Laid-Open No. 6-68702 discloses an illuminating device where light from a light source is introduced into one end of a fiberoptic cable, guided through the cable, and emitted from the other end of the cable so as to irradiate objects in front of the cable through a light-wave conducting path.

Figure 7A:
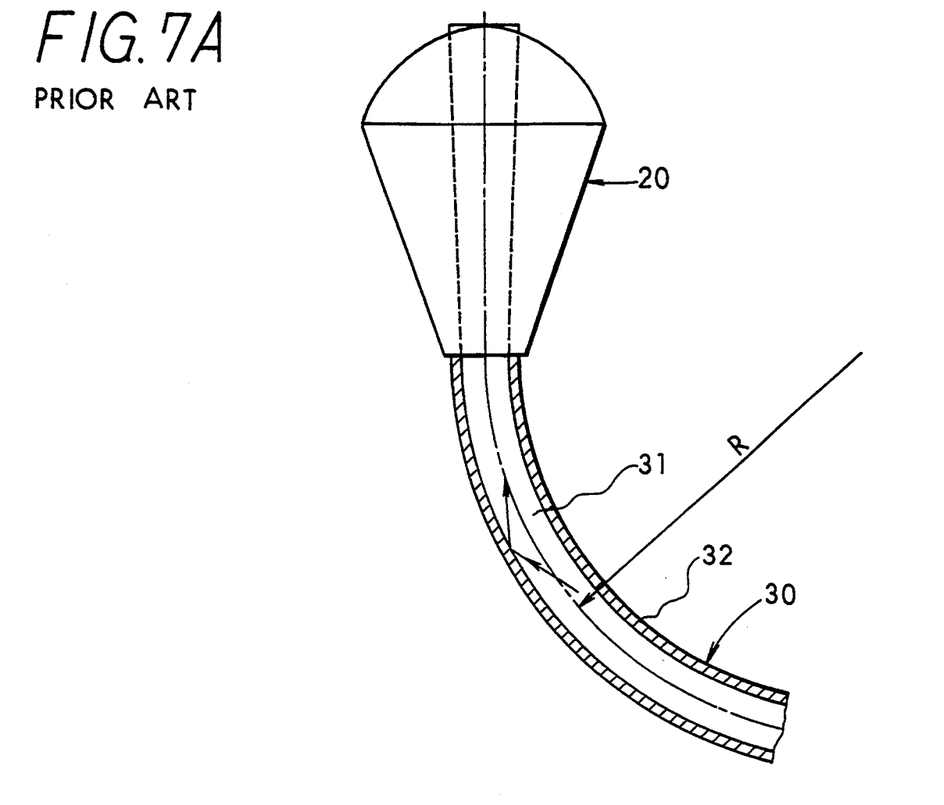
FIGS. 7A and 7B show a known illuminating device.
Figure 7B:
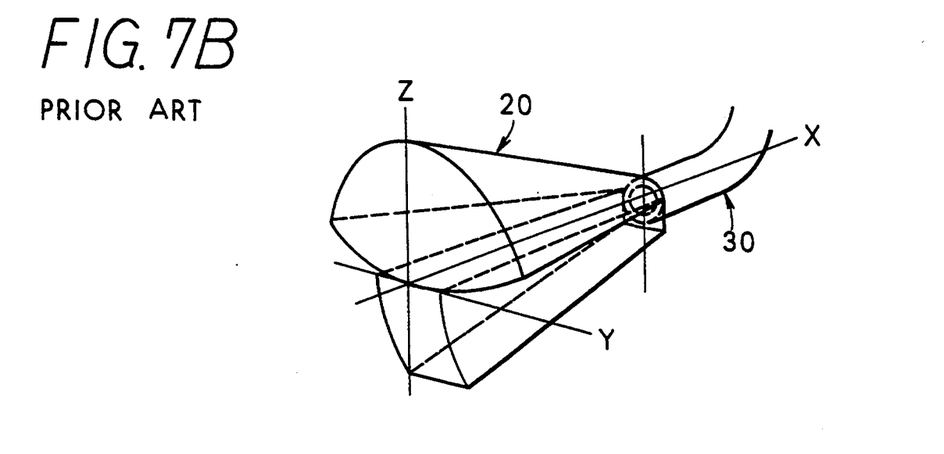

In such a device, as is illustrated in FIGS. 7A and 7B, when light emitted from a light source is introduced into illuminating device 20 after having travelled through fiberoptic cable 30, unless the light output port of the light source (not illustrated) and illuminating device 20 are disposed on the same straight line, fiberoptic cable 30 must be bent in order to have the light enter illuminating device 20. Bending the fiberoptic cable causes losses in light propagating therethrough unless the cable is bent by radius of curvature R larger than a certain level. Fiberoptic cable 30 consists of core 31 and clad 32 covering core 31, as is shown in FIG. 7A, and the index of refraction of clad 32 is smaller than that of core 31. When core 31 is formed of acrylic material and clad 32 of fluororesin, for example, the optical indices are 1.484 and 1.344, respectively.

Such a fiberoptic cable has a critical angle $\theta$ that will insure total reflection of incident light entering core 31. The critical angle $\theta$ is found to be 65° using the following formula (1):

$$n \sin \theta = n' \sin 90° \qquad (1)$$

or $$\theta = \sin^{-1}(n'/n)$$

Here, n represents the optical index of refraction of core 31 and n' represents the index of refraction of clad 32.

In order to introduce light with an angle that exceeds the critical angle, if the diameter of the fiberoptic cable having a composition as described above is 12.5 mm, the minimum radius of curvature is found to be 100 mm. Thus, in the case of FIGS. 7A and 7B, certain restrictions are placed upon the manner in which the fiberoptic cable may be arranged, and if such a fiberoptic cable is installed in a motor vehicle, problems arise and the overall size of the device may become quite large. Furthermore, if the fiberoptic cable should be forcibly bent in order to fit the cable within a limited space, the utilization of the output light is decreased.

SUMMARY OF THE INVENTION

Thus, the present invention has as an object thereof the provision of an illuminating device which overcomes these problems. The illuminating device of the present invention has an object of maintaining the utilization of light at a high level while ensuring that its original functions are unaffected despite relatively small structure.

According to the present invention, an illuminating device comprises a light source, a fiberoptic cable on which light from the light source is incident at a first end thereof with the fiberoptic cable emitting the incident light at a second end thereof, and a lamp device that emits the light from the fiberoptic cable along an optical irradiation axis so as to produce a desired light distribution. The lamp device has a light bending and conducting path ("LBCP") to which the output light from the fiberoptic cable is directly introduced and then bent by a desired angle toward the illuminating optical axis of a light conducting path lens. The light conducting path lens is directly connected to the LBCP and the light from the LBCP is directly output thereto. The light conducting path lens converts the light from the LBCP in order to produce a desired light distribution.

According to the present invention, when the fiberoptic cable emits the light transmitted from the light source, the output light enters the LBCP. All the light introduced into the LBCP is bent by a specified angle in the LBCP before entering the light conducting path lens. Since the light conducting path lens is formed so as to produce a desired light distribution, this distribution is produced by the output light. In this configuration, since both the light conducting path lens and the fiberoptic cable are connected by a LBCP bent by a specified angle, the angle of bending of the fiberoptic cable may be small so that the optical loss within the cable becomes small, thus improving the illuminating efficiency of the present invention. Furthermore, as restrictions on the placement of the fiberoptic cable are alleviated, the degree of freedom in installing the invention on assorted equipment is large, thus allowing the overall outside dimension of the illumination device to become compact.

Further, since the fiberoptic cable and the LBCP as well as the LBCP and the light conducting lens are directly connected with no airspaces interposed therebetween, light losses at respective connecting points are reduced, thus further improving the illuminating efficiency. Also, the LBCP and the lens are formed as an integral lamp, thus protecting the LBCP and the lens from contamination from water or dirt. Due to the elegantly simple construction of the present invention, it may be produced and sold at low cost.

BRIEF DESCRIPTION OF THE DRAWINGS

Other objects, features, and advantages of the present invention will become apparent to those skilled in the art upon study of the following detailed description, the appended claims, and drawings all of which form a part of this application.

In the drawings.

DETAILED DESCRIPTION OF THE PRESENTLY PREFERRED EXEMPLARY EMBODIMENTS

Figure 1:
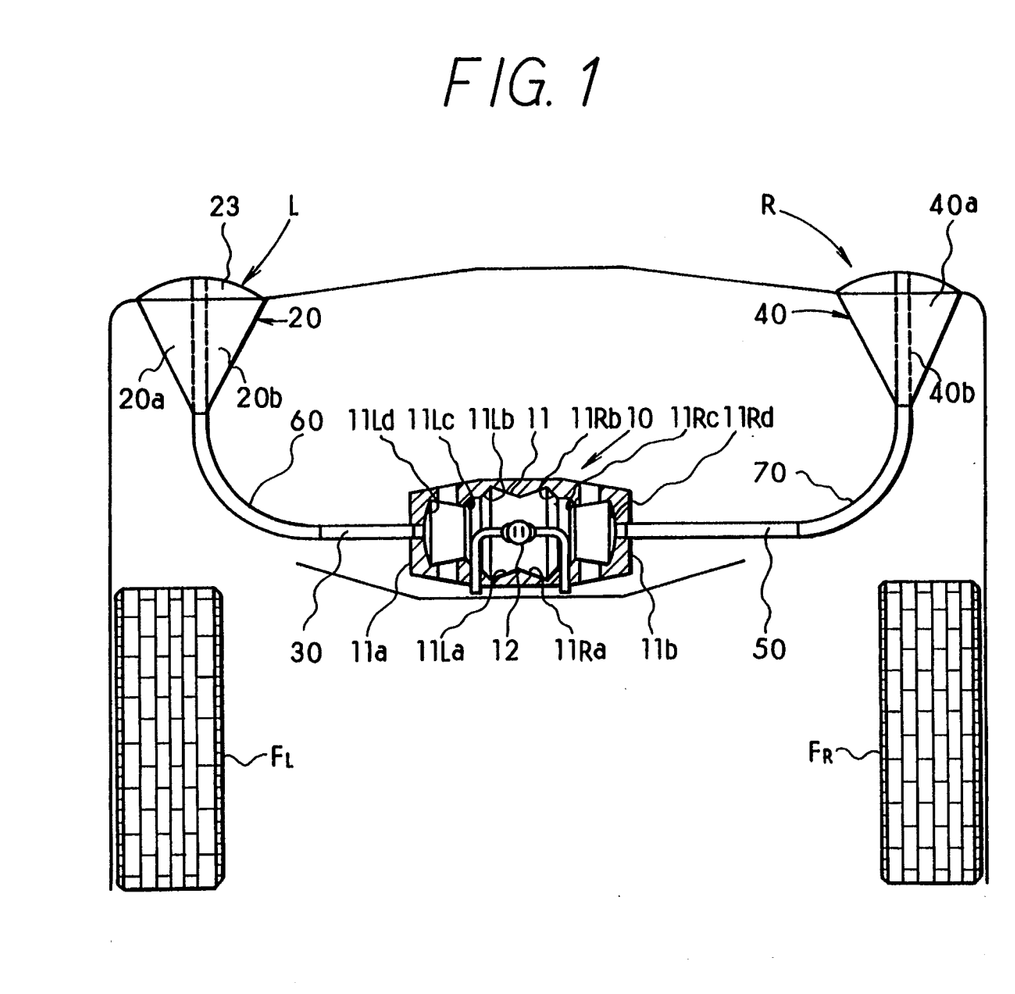
FIG. 1 is a partial schematic view of a first embodiment of the present invention used in a motor vehicle.

FIG. 1 illustrates an embodiment of an illuminating device according to the present invention that applied to a vehicle, such as an automobile or truck. The device includes light source 10 disposed at a center of the front part of a vehicle. Headlamp L and R are symmetrically disposed relative to light source 10. Light source 10 includes approximately cylindrical casing 11, which includes discharge tube 12 at the center of the axial direction. On an internal periphery of casing 11, left side elliptical mirror 11La, 11Lb, 11Lc, and 11Ld and right side elliptical mirrors 11Ra, 11Rb, 11Rc, and 11Rd are disposed symmetrically around discharge tube 12. Thus, light emitted from discharge tube 12 is reflected by right elliptical mirror 11Ra and left elliptical mirrors 11Lb through 11Ld and is converged on the center of right wall 11b of casing 11. Simultaneously, the light is reflected from the left elliptical mirror 11La and right elliptical mirrors 11Rb through 11Rd and is converged on the center of left wall 11a of casing 11. Elements FR and FL in FIG. 1 represent right and left front wheels of the vehicle.

Left headlamp L comprises lamp 20 installed on the left front end of the vehicle, LBCP 60 connecting lamp 20 and light source 10, and fiberoptic cable 30. Right headlamp R includes lamp 40 installed on the right front end of the vehicle, LBCP 70 connecting lamp 40 and light source 10, and fiberoptic cable 50. Since it is clear that headlamps L and R have the same structure, the following description simply refers to left headlamp L, while description of right headlamp R is omitted.

Figure 2:
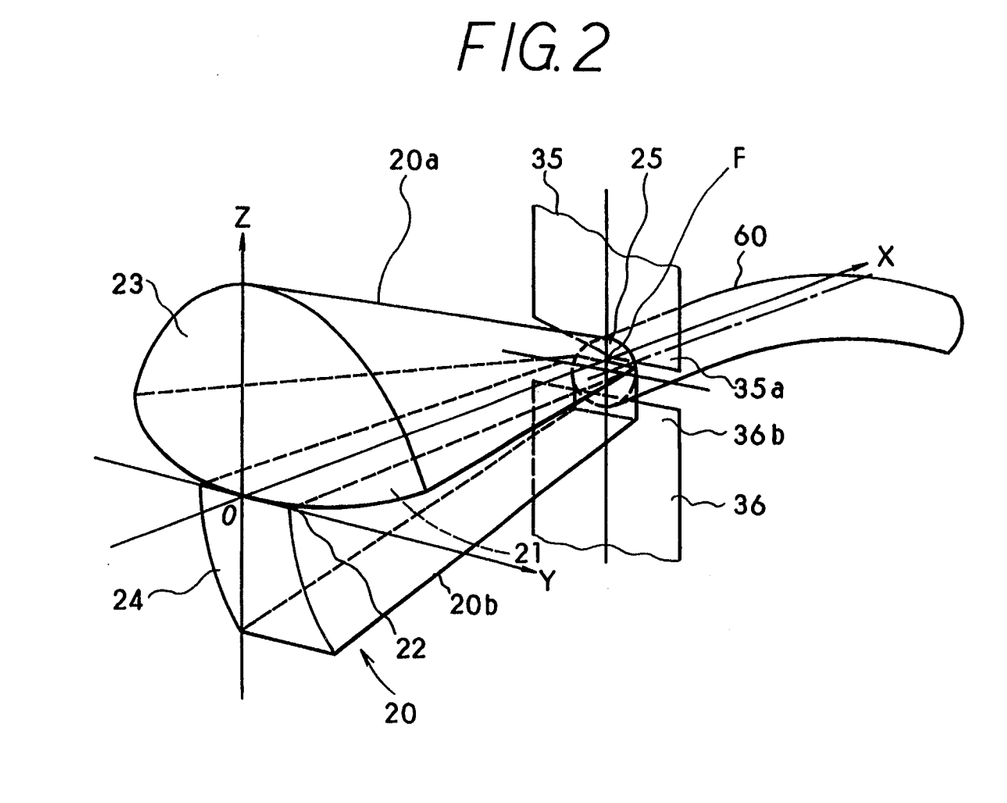
FIG. 2 is a plan view illustrating the present invention.

As illustrated in FIGS. 1 and 2, lamp 20 includes a light conducting path lens 20a as a first light conducting path lens, light conducting path lens 20b as second light conducting lens, and a pair of plate shades 35 and 36. Light conducting path lens 20a is made of a material having a high thermal resistance and a good light transmission characteristic, such as polycarbonate, acrylic resin) and roughly resembles one half of an equally divided cone. Light conducting path lens 20a is disposed directly on light conducting path lens 20b, and, at the bottom of lens 20a, is secured to top 22 of light conducting path lens 20b. Light emitting plane 23 of light conducting path lens 20a forms a lens plane having a specified index of refraction and pole 0 of plane 23 is identical to the origin of a three dimensional Cartesian coordinate system having X, Y, and Z axes with the optical axis of the light emitting plane being the X axis.

Furthermore, focal point F at the object point of plane 23 is disposed close to small diameter incident plane 25 of light conducting path lens 20a. Exit plane 23 acts as a means to illuminate the far front of the vehicle. Incident plane 25 of light conducting path lens 20a is disposed almost as a circle in the YZ coordinate plane, with the top and bottom of the incident plane being substantially circular arcs.

Light conducting path lens 20b is made of the same material as lens 20a, a material having high thermal resistance and good light transmission characteristics, such as polycarbonate acrylic resin. Further light conducting path lens 20b has a board-shape. Light exit plane 24 of light conducting path lens 20b has a focal point close to focal point F and its plane changes in a straight line in the Y axis direction. Thus, light exit plane 24 functions so as to illuminate the left or right front of the road surface when the vehicle turns left or right. Because bottom face 21 of light conducting path lens 20b is a mirror plane, it functions as a total reflection plane.

Both light conducting path lenses 20a and 20b, at the incident planes thereof, are secured to an exit end plane of bending and conducting path 60, described below, via respective shades 35 and 36. The bottom of the incident light plane of lens 20a and the top of incident light plane of lens 20b are secured to a middle section on the exit plane of light bending and conducting path 60. This allows the top of the incident plane of lens 20a to be shut down by lower edge 35a of shade 35 from the top of exit plane of light conducting path lens 20a, while the bottom of lens 20b is shut down via upper edge 36b of shade 36.

Figure 3:
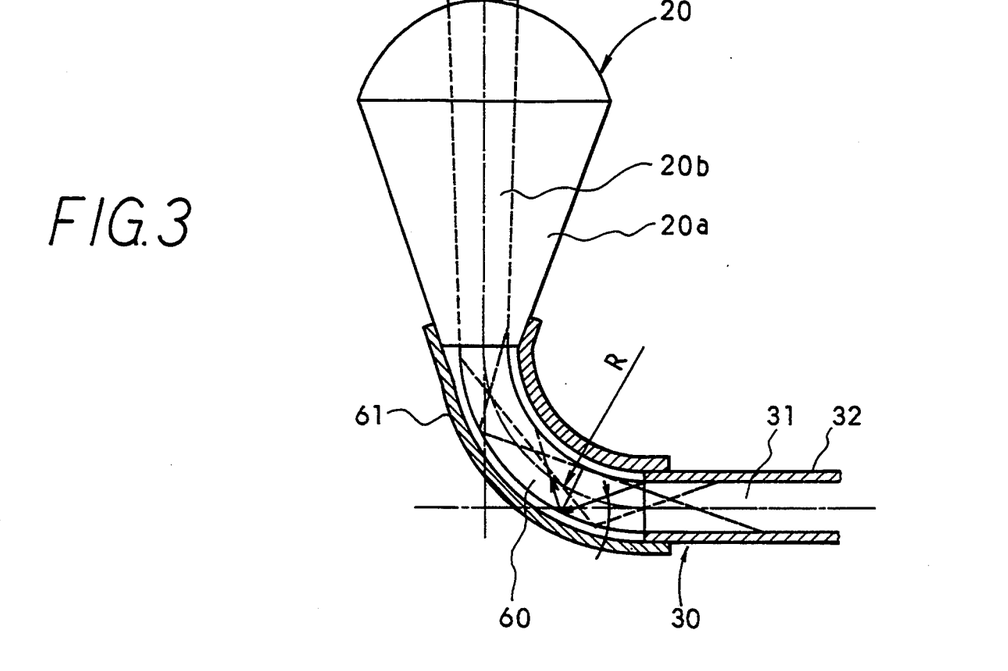
FIG. 3 is a cross sectional view of the first embodiment of the present invention.

As shown in FIG. 3, fiberoptic cable 30 includes rod core 31 made of a high thermal resistance material with good light transmission characteristics, such as polycarbonate or acrylic resin, and clad 32 covering rod core 31. The optical index of refraction of the component material of clad 32 is smaller than that of core 31 in order to allow total reflection. Core 31 of fiberoptic cable 30 has a diameter of about 8 to 15 mm in diameter and secured airtightly on the incident plane by and conducting path 60 via transparent adhesive.

LBCP 60 acts as a means for bending the incident light from to bend the incident light from fiberoptic cable 30 by 90° and for introducing the light into lenses 20a and 20b. LBCP 60 is made of the same material as core 31 of fiberoptic cable 30, i.e. a material of high thermal resistance and good light transmission characteristics, in a circular or cylindrical shape. The surface of LBCP 60 contacts a material having an index of refraction less than that of LBCP 60, namely air. Therefor, a tubular cover 61 is provided to prevent contamination by dust, dirt, water, etc.

In the above-described embodiment, it has been assumed that an acrylic resin having an index of refraction of 1.484 is used as the material for LBCP 60. If the surface of LBCP 60 contacts air, for example, its index of refraction turns out to be 1.0. If an incident light is emitted after being bent 90° using LBCP 60, critical angle $\theta$ of light necessary for total internal reflection of incident light to LBCP 60 is found to be about 42° using formula (1). If a material having a diameter of 12.5 mm is selected as LBCP 60, the maximum angle of light that can pass through the fiberoptic cable 30 is about 19.5°, and the minimum radius of curvature needs to be 40 mm for total internal reflection of the incident light in LBCP 60 in order to bend the light 90°.

Although air is the preferred material to have disposed over the surface over LBCP 60, any other material may be selected provided that its index of refraction is smaller than that of LBCP 60. In addition, the surface of LBCP 60 may be polished to be a mirror after vapor deposition processing so as to forcibly reflect inward the incident light to LBCP 60.

According to this embodiment, light emitted from light source 10 passes through fiberoptic cable 30 and then enters LBCP 60. Light incident in the LBCP 60 is further bent during total internal reflection within LBCP 60. The light emitted from LBCP 60 is introduced into light conducting lenses 20a and 20b via their incident planes. Since the indices of refraction at the joint between fiberoptic cable 30 and LBCP 60, and at the joint between LBCP 60 and lenses 20a and 20b hardly change, a portion of light corresponding to the light traversing the gap between bottom edge 35a of shade 35 and top edge 36b of shade 36 enters the light conducting lenses 20a and 20b.

Figure 4A:
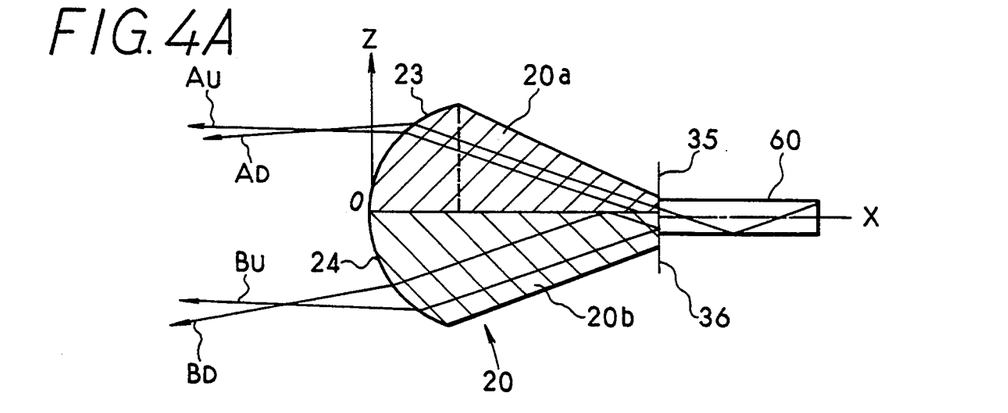
FIGS. 4A and 4B illustrate exiting light from the present invention.
Figure 4B:
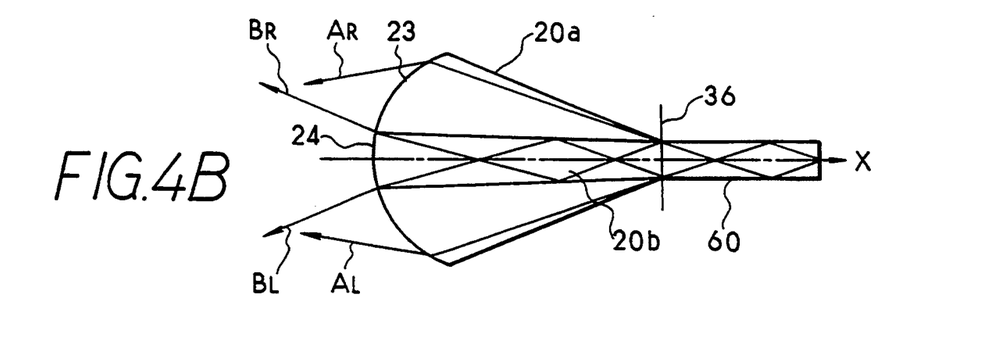

A portion of the incident light that proceeds in the XZ plane toward exit plane 23 progresses radially in relation to the focal point of exit plane 23 as parallel ray AD as depicted in FIG. 4A, with the ray being directed forward and downward as shown the drawing. Further, another portion of light is reflected from bottom plane 21 and then proceeds in the ZX plane toward exit plane 23. The light progresses radially in relation to the focal point of exit plane 23 and exits as parallel ray AU, substantially parallel to the X axis. Of the light incident on the light conducting path lens 20a, the portion proceeding straight in the XY plane progresses radially in relation with the focal point of the exit plane 23 and emits through the exits plane 23 as symmetrical and parallel rays AR and AL as shown in FIG. 4B. These rays eventually converge.

Of the light incident on lens 20b, the portion that proceeds directly in the ZX plane toward exit plane 24 progresses radially in relation with the focal point of exit plane 24 and is emitted through plane 24 as parallel ray BU as shown in FIG. 4A. Ray BU is nearly parallel to the X axis. Of the incident light to lens 20b, the portion reflected by top plane 22 and then proceeding straight to exit plane 24 in the ZX plane progresses radially in relation with the focal point of exit plane 24 and is emitted through the exit plane 24 as parallel ray BD. Of the incident light to lens 20b, the portion proceeding in the XY plane during reflection, is emitted through the exit plane 24 as symmetrical and parallel rays BR and BL. These rays disperse as distance from exit plane 24 increases.

If fiberoptic cable 30 emits the light from the light source 10, the light enters LBCP 60. Since the surface of LBCP 60 is in contact with a material having an index of refraction smaller than that of LBCP 60, namely air, path 60 is bent by 90° with a specified radius of curvature allowing total internal reflection. The entire quantity of light incident upon LBCP 60 is reflected within path 60 as it is bent 90°. The bent light enters lenses 20a and 20b so as to produce a desired optical distribution upon being emitted. Use of the present invention allows the radius of curvature to be reduced by 60 mm from the value of 100 mm previously accomplished. The present invention allows for a radius of curvature of 40 mm. Thus, the present invention allows for increased degrees of freedom as well as reduced dimensions.

As LBCP 60 is bent by 90° and LBCP has a specified radius of curvature and has its surface in contact with a material having a smaller index of refraction than that of LBCP 60, the entire incident light on LBCP 60 is reflected within path 60 without loss. Thus, light exiting fiberoptic cable 30 is introduced into lenses 20a and 20b without loss. Further, since the lamp device is designed to directly connect lenses 20a and 20b and fiberoptic cable 30 using LBCP 60, the lamp device according to the present invention has an elegantly simple, yet extremely useful, design and can be produced at low cost.

Figure 5A:
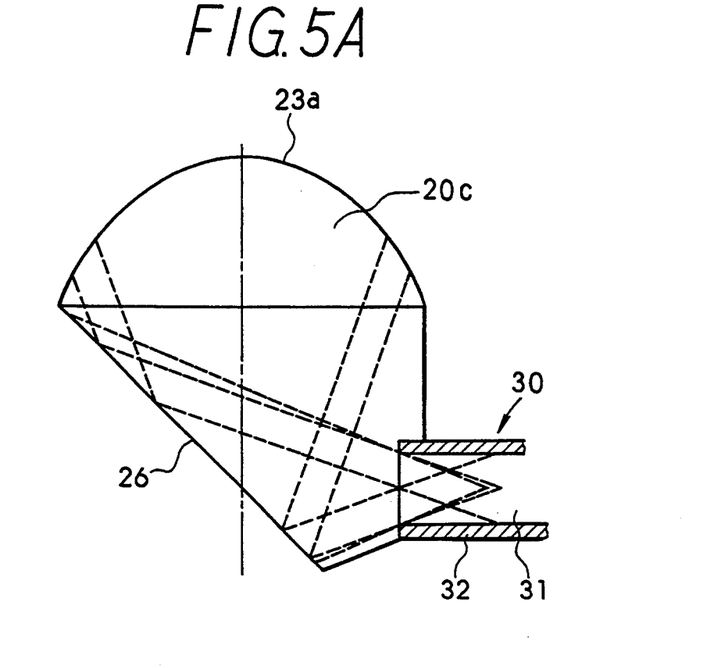
FIGS. 5A and 5B illustrate top and bottom views; respectively, of a modification of the first embodiment.

In the first embodiment, although the description concerned separate lenses 20a and 20b and LBCP 60, LBCP 60 and lenses 20a and 20b may be formed integrally. FIG. 5 illustrates an integral LBCP and light conducting lenses. Light conducting lens 20c corresponds to lens 20a in FIGS. 2 and 3 and includes fiberoptic cable 30 secured thereto at a 90° angle. In order to provide total internal reflection of light incident from cable 30, lens 20c is cut at 45° relative to the incident axis to form a reflection plane 26. Light incident from cable 30 is reflected on plane 26 thus bending the incident angle by 90° before exiting through exit plane 23a. When forming plane 26, material such as aluminum, silver, or others may be deposited by vaporizing to provide a mirror-finished reflection plane 26.

Figure 5B:
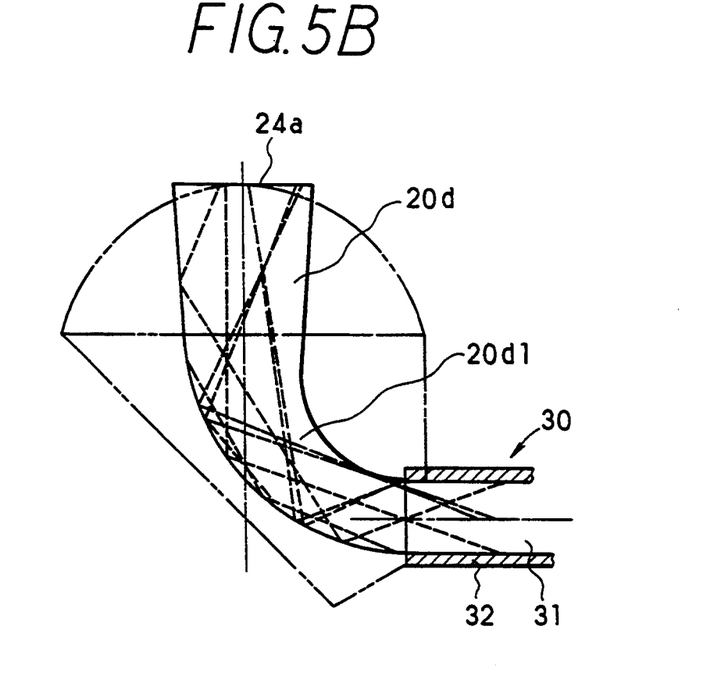

FIG. 5b depicts a light conducting lens 20d corresponding to lens 20b in FIGS. 2 and 3. Fiberoptic cable 30 is secured to lens 20d. Curve 20d1 of light conducting path lens 20d is bent 90° with a specified radius of curvature where it is secured to cable 30. Curve 20d1 contacts, like the previous light bending and conducting path 60, with a material having a smaller index of refraction, namely air. Since curve 20d1 bends 90° and has a specified radius of curvature in order to provide total internal reflection, the entire light entering curve 20d1 is reflected and bent 90° before being emitted from exit plane 24a.

If curve 20d1 is used, the minimum radius of curvature necessary to provide total internal reflection and a 90° bend is 35 mm. The difference in the radius of curvature between this embodiment and the first embodiment is that in light emitted from curve 20d1, the radius of curvature is larger at the peripheral reflection plane than at the center of the curve. This embodiment provides further advantages over the first embodiment in that it allows further size reductions and increased degrees of freedom.

Figure 6A:
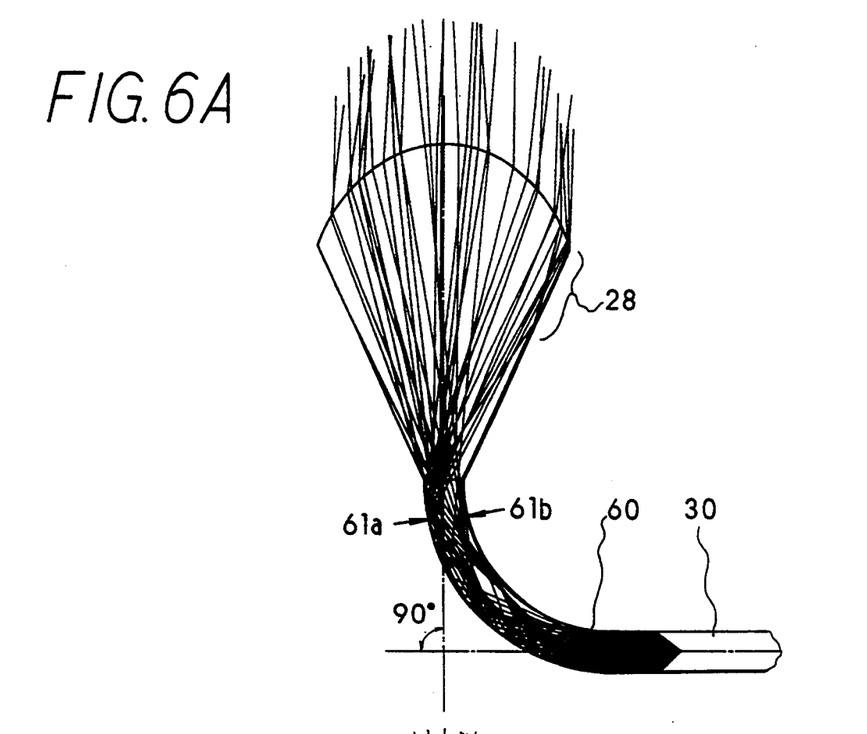
FIGS. 6A and 6B depict light emanating from the present invention.

If LBCP 60 of the first embodiment is used, FIG. 6A suggests that a section of coarse light density 61b and a section of dense light density 61a of lenses 20a and 20b, a portion of the emitted light is bent too sharply and is emitted through a side wall 28 of lens 20a. Thus, it is possible that a small light loss could be caused.

Figure 6B:
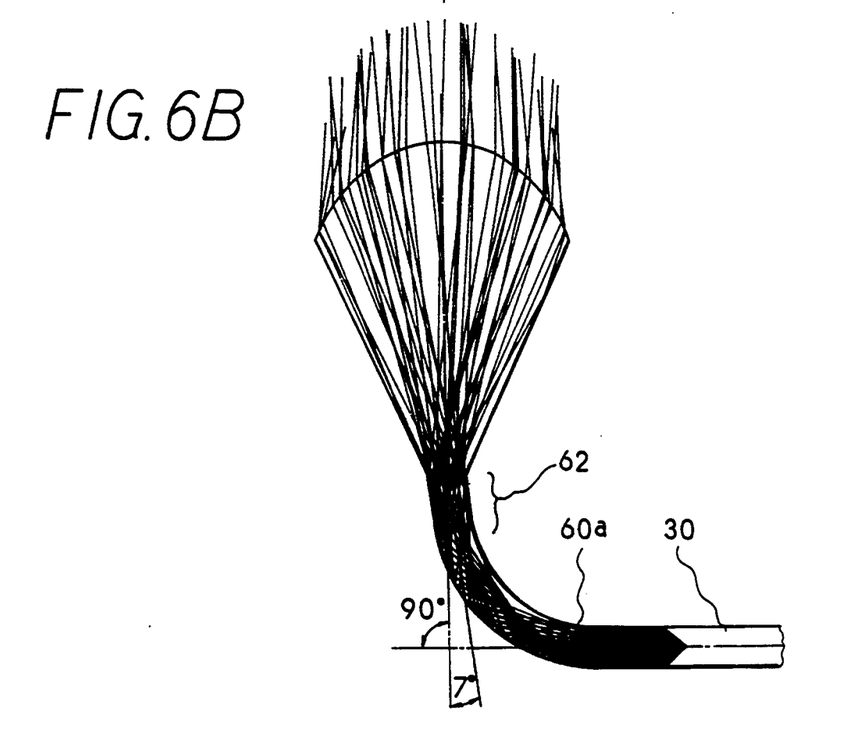

FIG. 6B illustrates a straight section provided near lenses 20a and 20b. LBCP 60a is disposed so that the incident angle to lenses 20a and 20b is inclined by another 7° compared with the first embodiment. This means that the light bending angle is adjusted to be $90° - 7° = 83°$. By providing a straight section 62 and using LBCP 60a, nearly all the light incident on the lenses 20a and 20b is emitted through exit planes 23a and 24b.

The present invention has been described in connection with what are presently considered to be the most practical and preferred embodiments of the present invention. However, this invention is not meant to be limited to the disclosed embodiments, but rather is intended to cover various modifications and equivalent arrangements included within the spirit and scope of the appended claims.

What is claimed is:

1. An illumination device comprising:
   a light source;
   a fiberoptic cable having first and second ends for conveying light incident on said first end and emitting said light at said second end; and
   a lamp device that produces a desired light distribution along an optical axis from said light emitted by said fiberoptic cable, said lamp device including:
   a light bending and conducting path, having an incident end and an emitting end, said incident end contacting said second end so as to directly introduce said light into said light bending and conducting path, said light bending and conducting path bending said light by a desired angle toward said optical axis; and a light conducting path lens directly coupled to said emitting end of said light bending and conducting path, said light conducting path lens converting said light into said desired light distribution;

wherein said light bending and conducting path includes a surface that contacts a medium having an index of refraction less than that of said light bending and conducting path.

2. An illumination device as claimed in claim 1, wherein said medium is air.

3. An illumination device as claimed in claim 2, wherein said light bending and conducting path includes a tubular bending section.

4. An illumination device as claimed in claim 3, wherein said light bending and conducting path includes a section that equalizes the optical density disposed toward said light conducting path lens.

5. An illumination device as claimed in claim 4, where said section is a linear section of said light bending and conducting path.

6. An illumination device as claimed in claim 5, wherein said linear portion has an axial direction inclined with respect to the optical axis, and said linear portion includes a gradient greater than a gradient of said bending portion.

7. An illumination device as claimed in claim 3, wherein said linear portion has an axial direction inclined with respect to the optical axis, and said linear portion includes a gradient greater than a gradient of said bending portion.

8. An illumination device as claimed in claim 2, wherein said light bending and conducting path is integrally formed with said light conducting path lens.

9. An illumination device as claimed in claim 1, wherein said illumination device is adapted for use in a motor vehicle.

10. An illumination device comprising:
means for producing light;
a fiberoptic cable, including a core and a cladding, having an incident end and an exit end, said incident end disposed proximate said producing means so as to allow said cable to transmit produced light;
lens means for producing a desired output light distribution; and
means for bending a light beam emitted from said exit end of said cable, and introducing said light beam into said lens means, said bending and introducing means being formed from the same material as said core of said cable;
wherein said cable is directly connected to said bending and introducing means and said bending and introducing means is directly connected to said lens means.

11. An illumination device as claimed in claim 10, wherein said lens means is a headlamp for a motor vehicle.

12. An illumination device as claimed in claim 10, wherein said material is one of polycarbonate and acrylic resin.

13. An illumination device as claimed in claim 10, wherein said bending means has a critical angle of about 42° to promote total internal reflection.

14. An illumination device as claimed in claim 10, wherein said lens means includes first and second lens elements.

15. An illumination device as claimed in claim 14, wherein said first lens element has substantially a semi-cone shape and said second lens is substantially board-shaped.

16. An illumination device as claimed in claim 10, wherein said bending means has a radius of curvature of about 40 mm.

17. An illumination device as claimed in claim 10, wherein said bending means has a radius of curvature of about 35 mm.

* * * * *